No. 630,849. Patented Aug. 15, 1899.
N. BOUVANG.
MAGAZINE PLATE HOLDER.
(Application filed Apr. 28, 1898.)
(No Model.)
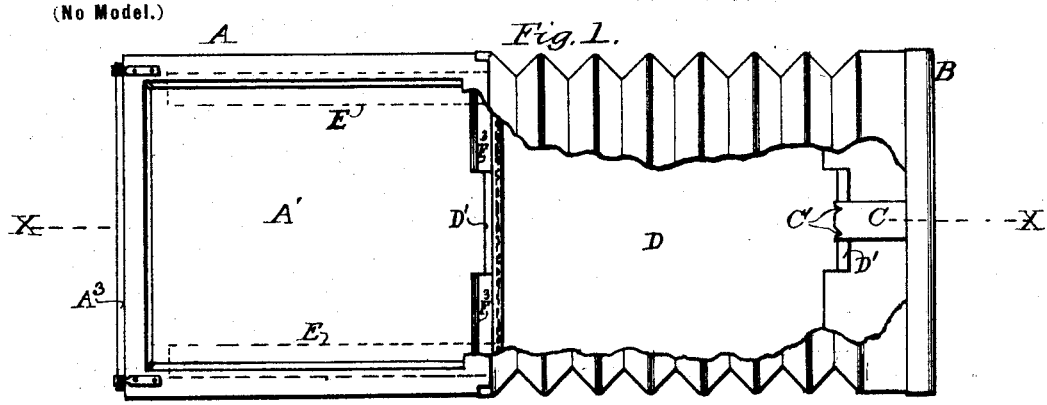
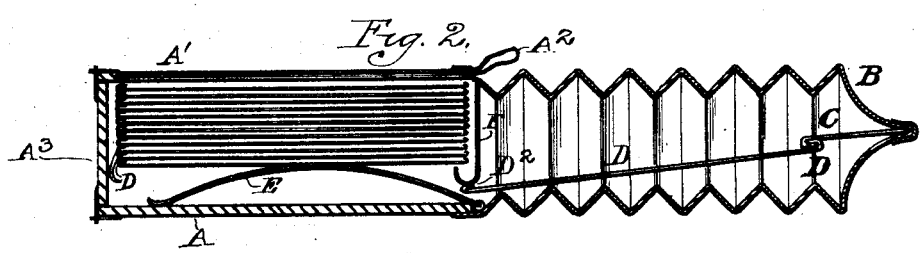
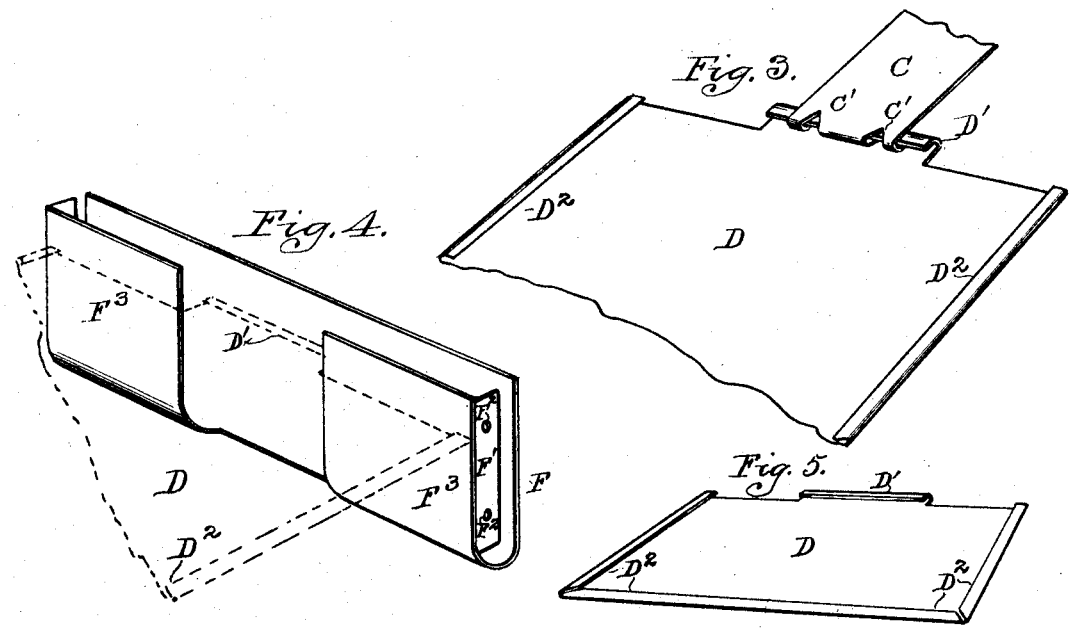
Witnesses:
Edwd. F. Dowling.
H. B. North
Inventor:
Nels Bouvang.
Per Morrison & Miller
Att'ys.
THE NORRIS PETERS CO., PHOTO-LITHO., WASHINGTON, D. C.

UNITED STATES PATENT OFFICE.

NELS BOUVANG, OF ROCKFORD, ILLINOIS.

MAGAZINE PLATE-HOLDER.

SPECIFICATION forming part of Letters Patent No. 630,849, dated August 15, 1899.

Application filed April 28, 1898. Serial No. 679,156. (No model.)

*To all whom it may concern:*

Be it known that I, NELS BOUVANG, a citizen of the United States, residing at Rockford, in the county of Winnebago and State of Illinois, have invented certain new and useful Improvements in Photographic Plate or Film Magazines for Cameras, of which the following is a specification.

The object of this invention is the production of a compact magazine for holding a number of sensitive photographic plates or films and presenting said plates or films one after another for exposure in the camera.

In the accompanying drawings, Figure 1 is a front elevation of my magazine, showing the extensible bellows partly broken away to illustrate the manner of manipulating the film-holders. Fig. 2 is a horizontal section on dotted line X X, Fig. 1, in which a film-holder is represented as having been removed from the front of the series in the magazine ready to be inserted as the rearmost holder in the series. Fig. 3 is a perspective view of the manipulating-hook, showing the manner of its engagement with the film-holder. Fig. 4 is a perspective view of the guard for retaining the film-holders in position in the magazine. Fig. 5 represents one of said film-holders.

Like letters of reference indicate corresponding parts throughout the several views.

A is a light-tight magazine having the usual hard-rubber shutter $A'$ in its face side.

$A^2$ is a loop attached to the shutter $A'$ for withdrawing the latter from its slide.

$A^3$ is a removable closure giving access to the interior of the magazine A.

B is a flexible extensible light-tight bellows attached to one side of the magazine A. It is made of leather or other flexible and durable material.

C is a grasping or manipulating hook in the closed end of the bellows B, fixed on the inside thereof.

$C'$ are notches in the hook C for engaging the film-holder.

D are the plate or film holders, made, preferably, of some thin light sheet metal or material, within which the plates or films are held.

$D'$ is a hooked tongue extending from one end of the plate-holder D.

$D^2$ are the overturned edges of the film-holders D. The film or plate is inserted beneath these edges and is thus held in close contact with the holder D.

E are two flat springs in the rear part of the magazine A for forcing the plate or film holders forward.

F is a guard for permitting the withdrawal of the most forward film-holder and the insertion of the same at the rear of all the other film-holders in the magazine A. This guard is secured in that end of the magazine to which the bellows B is attached, being fastened to the side of the magazine, leaving a little space above, and a somewhat larger space below, the guard F.

$F'$ are integral ears, and $F^2$ are openings in the ears, whereby the guard F is held in position in the magazine A. One side of the guard F is made in the two parts $F^3$ for admitting the hooked tongue $D'$ in the guard F.

In operation the sensitive films are placed in the film-holders D, the holders placed in the magazine A by removing the closure $A^3$, the whole placed in a camera and an exposure of the foremost film made. To remove this exposed film from its forward position, the grasping-hook C is caused to engage the hooked tongue $D'$ of the film-holder D and the holder is withdrawn, as shown in Fig. 1. When the holder is withdrawn sufficiently, its free end drops to a point below the guard F, when it may be pushed into place as the rearmost film in the series contained in the magazine A. After the film-holder D is withdrawn a little distance by the hook C it may be grasped by the thumb and finger of the operator and its course directed within the bellows with more certainty than if operated by the hook C alone. The hook C may be turned sidewise, engaging the film-holder D with one of the notches $C'$ in pushing the holder to place at the rear of the other holders.

I claim—

1. In a magazine for photographic plates or films, in combination, a series of plate or film holders, a light-tight compartment for holding the series, a light-tight flexible extensible portion for changing the relative positions of the plate or film holders, a hook for engaging one of the plate-holders of the series and a guard for preventing the hook from engaging any of the holders except the foremost one, substantially as and for the purpose specified.

2. In a magazine for photographic plates or films, in combination, a series of plate or film holders, each having a hook near one of its edges, a light-tight compartment for holding the series, a spring for holding the series forward in the compartment, a light-tight flexible, extensible portion for changing the relative positions of the plate or film holders, a hook on the inner side of the extensible portion for engaging one of the plate-holders of the series and drawing it outward into the extensible portion and a guard for preventing the hook from engaging any of the holders except the foremost one, substantially as and for the purpose specified.

NELS BOUVANG.

Witnesses:
 NELLIE BUNKER,
 L. L. MILLER.